United States Patent
Georgescu et al.

(10) Patent No.: US 7,236,046 B2
(45) Date of Patent: Jun. 26, 2007

(54) LED BIAS CURRENT CONTROL USING ADAPTIVE FRACTIONAL CHARGE PUMP

(75) Inventors: Sorin S. Georgescu, San Jose, CA (US); Anthony G. Russell, San Jose, CA (US); Chris B. Bartholomeusz, Santa Clara, CA (US)

(73) Assignee: Catalyst Semiconductor, Inc., Santa Clara, CA (US)

( * ) Notice: Subject to any disclaimer, the term of this patent is extended or adjusted under 35 U.S.C. 154(b) by 0 days.

(21) Appl. No.: 11/264,884

(22) Filed: Nov. 1, 2005

(65) Prior Publication Data

US 2007/0096795 A1   May 3, 2007

(51) Int. Cl.
*G05F 1/10* (2006.01)
*G05F 3/02* (2006.01)
(52) U.S. Cl. ..................................... 327/536
(58) Field of Classification Search ............... 327/536; 363/59–60
See application file for complete search history.

(56) References Cited

U.S. PATENT DOCUMENTS

| | | | | |
|---|---|---|---|---|
| 5,870,295 A | * | 2/1999 | Watanabe | 363/60 |
| 6,556,064 B1 | * | 4/2003 | Yatabe | 327/536 |

* cited by examiner

*Primary Examiner*—Quan Tra
(74) *Attorney, Agent, or Firm*—Bever, Hoffman & Harms, LLP; E. Eric Hoffman

(57) ABSTRACT

A charge pump provides a multiplication factor of 4/3 by using a three-phase mode of operation. In a first mode, first and second capacitors are charged from an input voltage while a third capacitor drives the output voltage based on stored charge in the third capacitor. In a second mode, the voltage potential across the first capacitor is added to the input voltage to generate the output voltage. In a third mode, the voltage potential across the first capacitor is subtracted from the sum of the input voltage and the voltage potential across the second capacitor to generate the output voltage. Operated in this manner, the first, second, and third capacitors will provide the desired 4/3× voltage multiplication. This relatively low multiplication factor can be beneficial in applications such as white LED driver circuits, particularly where the input voltage is provided by a battery.

23 Claims, 8 Drawing Sheets

LED BIAS CURRENT CONTROL USING ADAPTIVE FRACTIONAL CHARGE PUMP

BACKGROUND OF THE INVENTION

1. Field of the Invention

The invention relates to the field of electronic circuits, and in particular, to an efficient, low noise fractional charge pump.

2. Related Art

White LEDs (light emitting diodes) are becoming increasing common in modern electronic devices. For example, portable electronics such as cell phones, personal digital assistants (PDAs), and game systems often include graphical displays that are backlit by white LEDs. However, the battery power used in such devices generally provides a supply voltage that is below or just at the voltage required to drive white LEDs (typically around 3.6 V). For example, a modern rechargeable lithium ion or lithium polymer battery is typically rated to have a nominal output voltage of 3.7 V, but may actually provide a voltage in the range of 2.7 to 4.2 V, depending on the charge state of the battery.

This variability in battery supply voltage necessitates voltage boosting circuitry in most white LED-based portable devices. One of the most common schemes is to use a charge pump. A charge pump uses the charge storage capabilities of capacitors to generate an output voltage that is elevated with respect to a supply voltage. Modern white LED-based portable devices generally use one of two types of conventional charge pumps.

The first type of charge pump is known as a "2×" charge pump (sometimes referred to as a "voltage doubler"). FIGS. 1A and 1B show schematic diagrams of a conventional 2× charge pump 100 for receiving an input voltage V_IN1 and providing an elevated output voltage V_OUT1 to a load D130 (depicted as an LED for exemplary purposes). Charge pump 100 includes an input terminal 101, a charging capacitor C110, a storage capacitor C120, and an output terminal 102. While not shown for clarity, charge pump 100 also includes interconnect circuitry for connecting capacitors C110 and C120 in the configurations shown in FIGS. 1A and 1B.

Charge pump 100 operates by switching between the two phases of operation shown in FIGS. 1A and 1B. In FIG. 1A, a charging phase is shown, in which capacitor C110 is connected between input terminal 101 and ground, while capacitor C120 is connected between ground and output terminal 102 (load D130 is always connected between output terminal 102 and ground). During this charging phase, capacitor C110 is charged by input voltage V_IN1 to a voltage V11. Because capacitor C110 is connected directly between input voltage V_IN1 and ground, the voltage V11 stored on capacitor C110 will eventually be equal to input voltage V_IN1. During this charging of capacitor C110, a voltage V12 stored on capacitor C120 is provided as output voltage V_OUT1 for driving load D130.

Then, in a discharging phase shown in FIG. 1B, capacitor C110 is connected between input terminal 101 and output terminal 102, with capacitor C110 inverted with respect to input terminal 101. In other words, during the charging phase depicted in FIG. 1A, the positive plate in capacitor C110 (marked with a triangular indicator) is connected to input terminal 101, while the negative plate (unmarked) is connected to ground, thereby allowing input voltage V_IN1 to charge capacitor C110. Then, during the discharge phase depicted in FIG. 1B, the negative plate of capacitor C110 is connected to input terminal 101. The potential across capacitor C110 (i.e., voltage V11) is therefore added to input voltage V_IN1, thereby providing the sum of voltages V_IN1 and V11 at output terminal 102. Since voltage V11 is raised to voltage V_IN1 during the charging phase (FIG. 1A), the sum of voltages V_IN1 and V11 is simply twice the input voltage (i.e., 2*V_IN1). Thus, during the discharging phase (FIG. 1B), twice the input voltage V_IN1 is provided at output terminal 102 to drive load D130. At the same time, capacitor C120 is charged to twice the input voltage. When charge pump switches back to the charging phase, capacitor C120 resumes driving load D130 while capacitor C110 is recharged by input voltage V_IN1.

In this manner, 2× charge pump 100 can raise a battery voltage (e.g., 3.7 V) to a level (e.g., 7.4 V) that is more than sufficient to drive a white LED. However, the voltage doubling provided by 2× charge pump 100 is typically a much larger scaling effect than is required for white LED applications. Specifically, as noted above, a white LED typically exhibits a forward voltage in the range of 3.5 to 4.0 V, while a lithium ion battery source may provide anywhere in the range of 2.7 V to 4.2 V. Therefore, an LED driver circuit incorporating charge pump 100 would require attenuation circuitry to drop the 5.4 to 8.4 V charge pump output voltage down to the level required by the white LED. Such attenuation circuitry (e.g., a resistor in series with the LED) may dissipate a significant amount of power to provide the desired voltage attenuation, and can therefore substantially reduce the power efficiency of an LED driver circuit that incorporates 2× charge pump 100. Therefore, to improve the efficiency of charge pump-based LED driver circuits, a "3/2×" charge pump are commonly used.

FIGS. 2A and 2B show schematic diagrams of a conventional 3/2× charge pump 200 for receiving an input voltage V_IN2 and providing an elevated output voltage V_OUT2 to a load D240 (depicted as an LED for exemplary purposes). Charge pump 200 includes an input terminal 201, charging capacitors C210 and C220, a storage capacitor C230, and an output terminal 202. While not shown for clarity, charge pump 200 also includes interconnect circuitry for connecting capacitors C210, C220, and C230 in the configurations shown in FIGS. 2A and 2B.

Charge pump 200 operates by switching between the two phases of operation shown in FIGS. 2A and 2B. In FIG. 2A, a charging phase is shown, in which capacitors C210 and C220 are serially connected between input terminal 201 and ground, while capacitor C230 is connected between ground and output terminal 202 (load D240 is always connected between output terminal 202 and ground). During this charging phase, capacitors C210 and C220 are charged by input voltage V_IN2 to voltages V21 and V22. Under steady state conditions, capacitors C210 and C220 will both be charged to half of input voltage V_IN2 during this charging phase. Meanwhile, a voltage V23 stored on capacitor C230 is provided as output voltage V_OUT2 for driving load D240.

Then, in a discharging phase shown in FIG. 2B, capacitors C210 and C220 are connected in parallel between input terminal 201 and output terminal 202. In a manner similar to that described with respect to FIG. 1B, capacitors C210 and C220 are inverted with respect to input terminal 201. Specifically, whereas during the charging phase, the positive plate (marked with a triangular indicator) of capacitor C210 is connected to input terminal 201, during the discharging phase, the negative plate (unmarked) of capacitor C210 is connected to input terminal 201. Likewise, whereas during the charging phase, the positive plate (marked with a triangular indicator) is the upstream plate (i.e., the plate "closer"

to input voltage V_IN2), during the discharging phase, the negative plate (unmarked) of capacitor C220 is connected to input terminal 201. Hence, during the discharging phase, the negative plate of capacitor C220 is the upstream plate.

Because capacitors C210 and C220 are inverted and connected in parallel after input terminal 201, the output voltage V_OUT2 provided during the discharging phase shown in FIG. 2B is equal to the sum of input voltage V_IN2 and the average of voltages V21 and V22 on capacitors C210 and C220, respectively. As described above with respect to FIG. 2A, both capacitors C210 and C220 are charged to half of input voltage V_IN2 during the charging phase. Therefore, the output voltage V_OUT2 provided during the discharging phase is simply equal to one and a half times input voltage V_IN2 (i.e., 1.5*V_IN2).

Therefore, the output voltage range of 3/2× charge pump 200 is between 4.05 V and 6.3 V when provided with a lithium ion battery voltage (i.e., 2.7 V to 4.2 V) as in input voltage. Because the output voltage range provided by 3/2× charge pump 200 is lower than that provided by 2× charge pump 100 for a given input voltage range, a white LED driver circuit incorporating 3/2× charge pump 200 requires less voltage attenuation than a driver circuit incorporating 2× charge pump 100, thereby allowing the 3/2× charge pump-based driver circuit to exhibit greater power efficiency.

However, as portable devices become increasingly advanced while at the same time shrinking in size, power efficiencies must continually be improved. While 3/2× charge pump 200 can reduce power consumption in a white LED driver circuit over 2× charge pump 100, 3/2× charge pump 200 is not ideally suited for such an application, since the forward voltage for a white LED (i.e., 3.5 to 4.0 V) is still significantly lower than even the lowest output voltage provided by the 3/2× charge pump 200 (i.e., 4.5 V). This voltage difference represents an inefficiency that will ultimately reduce overall device battery life.

Therefore, a 4/3× charge pump has been developed that applies a 4/3× multiplication factor to an input voltage (e.g., a 2.7 V to 4.2 V input voltage range is transformed into a 3.6 V to 5.6 V output voltage range). This output voltage range is still sufficient to drive white LEDs, but requires less voltage attenuation at the top end. Therefore, a 4/3× charge pump can improve LED drive circuit efficiency over 3/2× charge pumps and 2× charge pumps.

Conventional 4/3× charge pumps include three charging capacitors and one storage capacitor to provide the desired 4/3× voltage multiplication. FIGS. 3A and 3B show schematic diagrams of a conventional 4/3× charge pump 300 for receiving an input voltage V_IN3 and providing an elevated output voltage V_OUT3 to a load D350 (depicted as an LED for exemplary purposes). Charge pump 300 includes an input terminal 301, charging capacitors C310, C320, and C330, a storage capacitor C340, and an output terminal 302. While not shown for clarity, charge pump 300 also includes interconnect circuitry for connecting capacitors C310, C320, C330, and C340 in the configurations shown in FIGS. 3A and 3B.

Charge pump 300 operates by switching between the two phases of operation shown in FIGS. 3A and 3B. In FIG. 3A, a charging phase is shown, in which capacitors C310, C320, and C330 are serially connected between input terminal 301 and ground, while capacitor C340 is connected between ground and output terminal 302 (load D350 is always connected between output terminal 302 and ground). During this charging phase, capacitors C310, C320, and C330 are charged by input voltage V_IN3 to voltages V31, V32, and V33, respectively. Under steady state conditions, capacitors C310, C320, and C330 will be charged to one third of input voltage V_IN3 during the charging phase. Meanwhile, a voltage V34 stored on capacitor C340 is provided as output voltage V_OUT3 for driving load D350.

Then, in a discharging phase shown in FIG. 3B, capacitors C310, C320, and C330 are connected in parallel between input terminal 301 and output terminal 302. In a manner similar to that described with respect to FIG. 2B, capacitors C310, C320, and C330 are inverted with respect to input terminal 301. Therefore, the output voltage V_OUT3 provided during the discharging phase shown in FIG. 3B is equal to the sum of input voltage V_IN3 and the voltage on each of capacitors C310, C320, and C330. As described above with respect to FIG. 3A, C310, C320, and C330 are all charged to one third of input voltage V_IN3 during the charging phase. Therefore, the output voltage V_OUT3 provided during the discharging phase is simply equal to one and one third times input voltage V_IN3 (i.e., 4/3*V_IN3).

Therefore, the output voltage range of 4/3× charge pump 300 is between 3.6 V and 5.6 V when provided with a lithium ion battery voltage (i.e., 2.7 V to 4.2 V) as in input voltage. Because the output voltage range provided by 4/3× charge pump 300 is lower than that provided by 3/2× charge pump 200 for a given input voltage range, a white LED driver circuit incorporating 4/3× charge pump 300 requires less voltage attenuation than a driver circuit incorporating 3/2× charge pump 200, thereby allowing the 4/3× charge pump-based driver circuit to exhibit greater power efficiency.

Unfortunately, this improved power efficiency provided by 4/3× charge pump 300 comes at the expense of an additional capacitor (C330) over 3/2 charge pump 200. The relatively large capacitance values (and hence, capacitor sizes) required to provide reasonable charge pump power capabilities can preclude inclusion of the additional capacitor "on chip", due to die size limitations. Moving the capacitor(s) "off chip" reduces this size burden but adds a new requirement of additional pins in the chip package to communicate with the external capacitor(s). As a result, chip package size and cost is negatively impacted.

Accordingly, it is desirable to provide a system and method for driving white LEDs that maximizes power efficiency while minimizing die area requirements.

SUMMARY OF THE INVENTION

Conventional charge pumps can generate output voltages that are higher than necessary for many applications. The excess voltage gain must then be attenuated, which results in wasted power (and reduced battery life for devices incorporating conventional charge pumps). By providing a charge pump that applies a 4/3× voltage scaling factor, rather than the conventional 3/2× or 2× scaling factors, a lower output voltage can be achieved for a given input voltage, which can beneficially improve power efficiency in situations where conventional charge pumps provide excessive voltage multiplication.

In one embodiment, a 4/3× charge pump can include first, second, and third capacitors, with the third capacitor connected between the output terminal of the charge pump and ground. The first and second capacitors are connected in three different connections to the input terminal of the charge pump during three different phases of operation to provide the 4/3× multiplier function.

In a charging phase, the first and second capacitors are connected in series between the input terminal and ground, so that the output terminal is driven by the charge stored on the third capacitor. In a first discharging phase, the first capacitor is connected between the input terminal and the output terminal, but inverted relative to the input terminal, so that the voltage provided at the output terminal is the sum of the input voltage and the voltage across the first capacitor.

Finally, in a second discharging phase, the first and second capacitors are connected between the input terminal and the output terminal, with the second capacitor inverted relative to its orientation during the charging phase, and the first capacitor returned to its charging phase orientation. Therefore, the output voltage provided during the second discharging phase is equal to the sum of the input voltage and the voltage potential across the second capacitor, minus the voltage potential across the first capacitor.

By operating the charge pump in this manner, the average voltages on the first and second charge pumps will be one third and two thirds, respectively, of the input voltage, thereby causing the average output voltage provided by the charge pump to be equal to 1.33 times the input voltage. In one embodiment, if the first, second, and third capacitors all have the same capacitance and the wiring and switch resistances between the capacitors are substantially the same, the charge pump can be implemented as a low input noise charge pump by setting the duration of the first discharging phase to be twice as long as the charging phase and the second discharging phase.

The invention will be more fully understood in view of the following description and drawings.

DETAILED DESCRIPTION

Conventional charge pumps can generate output voltages that are higher than necessary for many applications. The excess voltage gain must then be attenuated, which results in wasted power (and reduced battery life for devices incorporating conventional charge pumps). By providing a charge pump that applies a 4/3× voltage scaling factor, rather than the conventional 3/2× or 2× scaling factors, a lower output voltage can be achieved for a given input voltage, which can beneficially improve power efficiency in situations where conventional charge pumps provide excessive voltage multiplication.

Figure 4A:
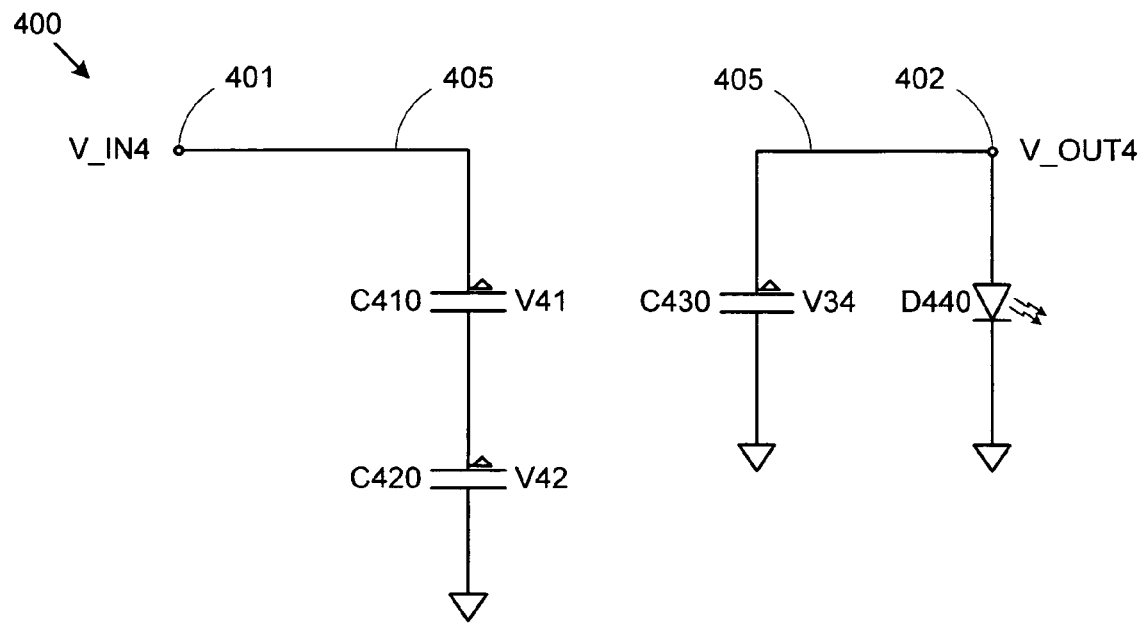
FIGS. 4A, 4B, and 4C are schematic diagrams of the operation of a reduced area 4/3× charge pump, in accordance with an embodiment of the invention.
Figure 4B:
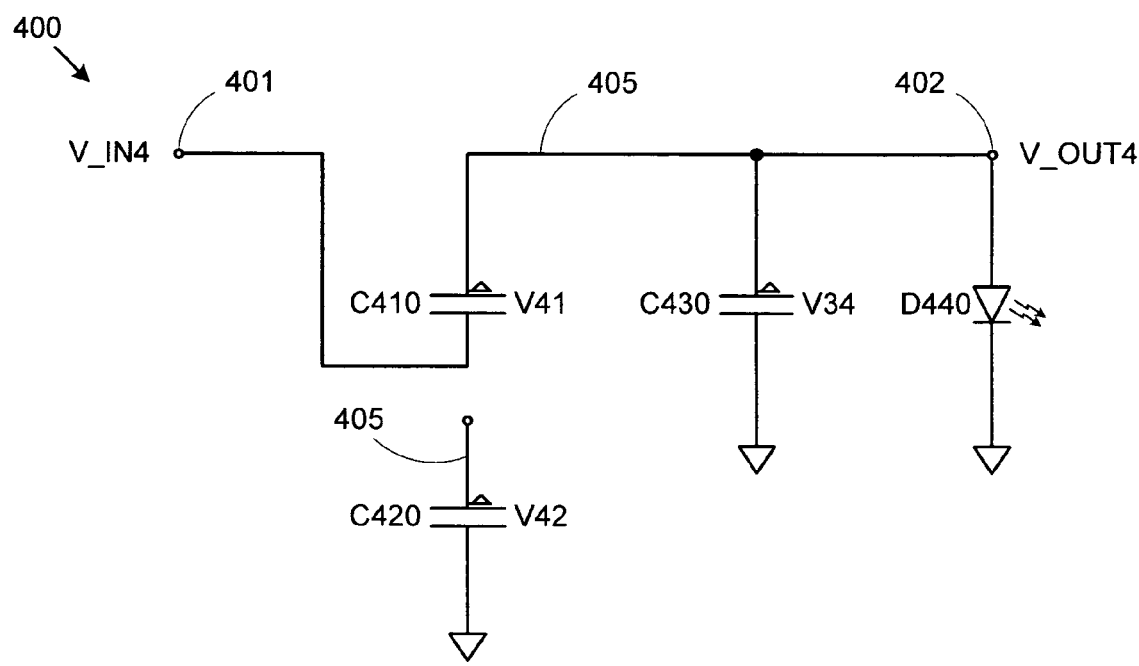
Figure 4C:
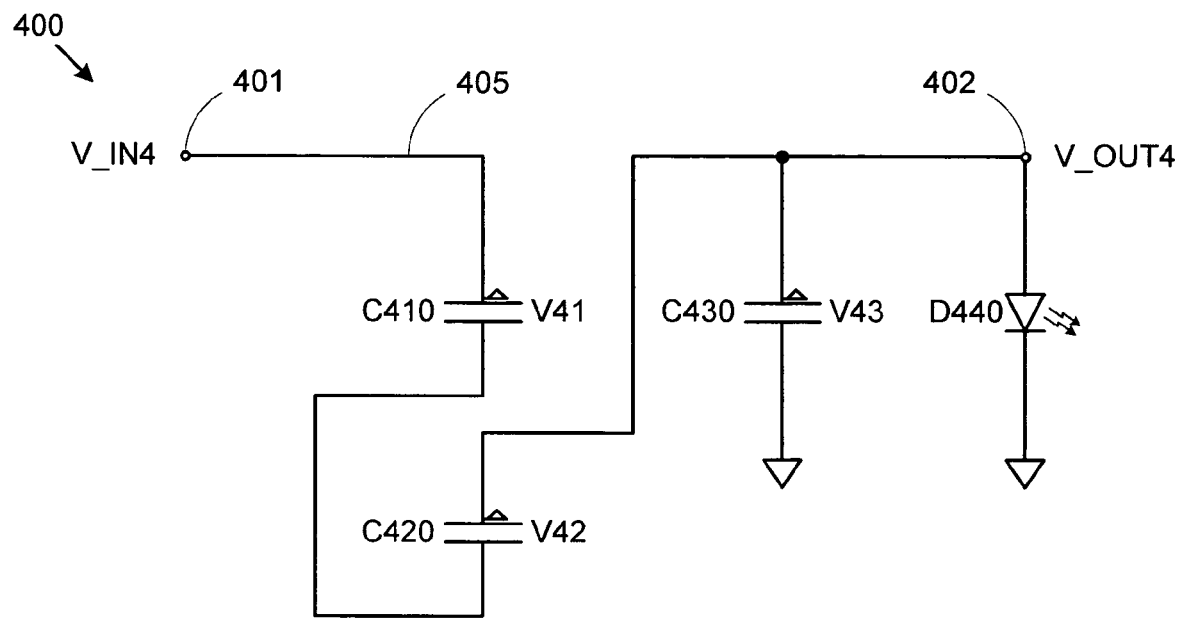

FIGS. 4A, 4B, and 4C show schematic diagrams of an embodiment of a 4/3× charge pump 400 for receiving an input voltage V_IN4 and providing an elevated output voltage V_OUT4 to a load D440 (depicted as an LED for exemplary purposes). Charge pump 400 includes an input terminal 401, charging capacitors C410 and C420, a storage (output) capacitor C430, and an output terminal 402. Charge pump 400 also includes interconnect circuitry 405 (e.g., wiring, switches, control logic) for wiring (i.e., providing the electrical paths between) capacitors C410, C420, and C430 in the configurations shown in FIGS. 4A, 4B, and 4C. An exemplary switching configuration for interconnect circuitry is described below with respect to FIG. 4D.

Charge pump 400 operates by switching between the three phases of operation shown in FIGS. 4A, 4B, and 4C. In FIG. 4A, a charging phase is shown, in which capacitors C410 and C420 are serially connected between input terminal 401 and ground. Meanwhile, capacitor C430 is connected between ground and output terminal 402 (load D440 is always connected between output terminal 402 and ground). Note that "ground" can refer to any supply voltage lower than input voltage V_IN4, such that capacitor C430 and load D440 are connected between output terminal 402 and a lower supply voltage terminal (not shown for clarity).

During the charging phase, capacitors C410 and C420 are charged by input voltage V_IN4 to voltages V41 and V42, while a voltage V43 stored on capacitor C430 is provided as output voltage V_OUT4 for driving load D440. Note that because capacitors C410, C420, and C430 are always either charging or discharging, voltages V41, V42, and V43 are actually average voltages. However, so long as the different operational phases are short enough, the actual changes in voltages V41, V42, and V43 during each phase will be relatively small. Therefore, for descriptive and analytical purposes, voltages V41, V42, and V43 can be considered to be essentially constant.

In a first discharging phase shown in FIG. 4B, capacitor C420 is disconnected from any charge/discharge paths, and capacitor C410 is connected between input terminal 401 and output terminal 402, with the orientation of capacitor C410 with respect to input terminal 401 being inverted with respect to its charging orientation. In other words, during the first discharging phase, the negative plate (unmarked) of capacitor C410 is connected to input terminal 401, while the positive plate (marked with a triangular indicator), which was connected to input terminal 401 during the charging phase shown in FIG. 4A, is connected to output terminal 402. The potential across capacitor C410 generated during the charging phase is therefore added to input voltage V_IN4 to generate output voltage V_OUT4 during the first discharging phase shown in FIG. 4B. Thus, during the first discharging phase, output load D440 is driven by, and storage capacitor C430 is charged by, the sum of input voltage V_IN4 and voltage V41 on capacitor C410. Capacitor C420 is isolated during this first discharging phase (i.e., removed from and charging or discharging circuit), and so retains the charge stored during the charging phase.

Then, in a second discharging phase shown in FIG. 4C, capacitors C410 and C420 are connected in series between input terminal 401 and output terminal 402. Capacitor C410 is returned to its charging phase orientation with respect to input terminal 401, while the orientation of capacitor C420 with respect to input terminal 401 is inverted compared to its charging phase orientation. Specifically, the positive plate (marked with a triangular indicator) of capacitor C410 is connected to input terminal 401, while the negative plate of capacitor C420 is connected to the negative plate of capacitor C430. Therefore, during the second discharging phase depicted in FIG. 4C, output voltage V_OUT4 is provided by the sum of input voltage V_IN4 and the voltage V42 across capacitor C420, minus the voltage V41 across capacitor C410. This output voltage V_OUT4 then drives load D440 and charges storage capacitor C430. The process then switches back to the charging phase of FIG. 4A and continues cycling in this manner to provide the desired charge pumping action.

Figure 1A:
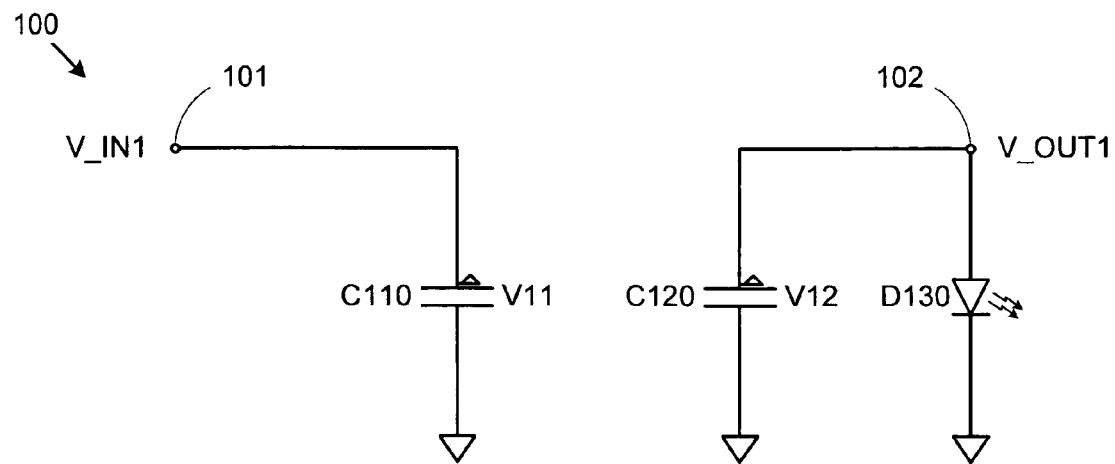
FIGS. 1A and 1B are schematic diagrams of the operation of a conventional 2× charge pump.
Figure 1B:
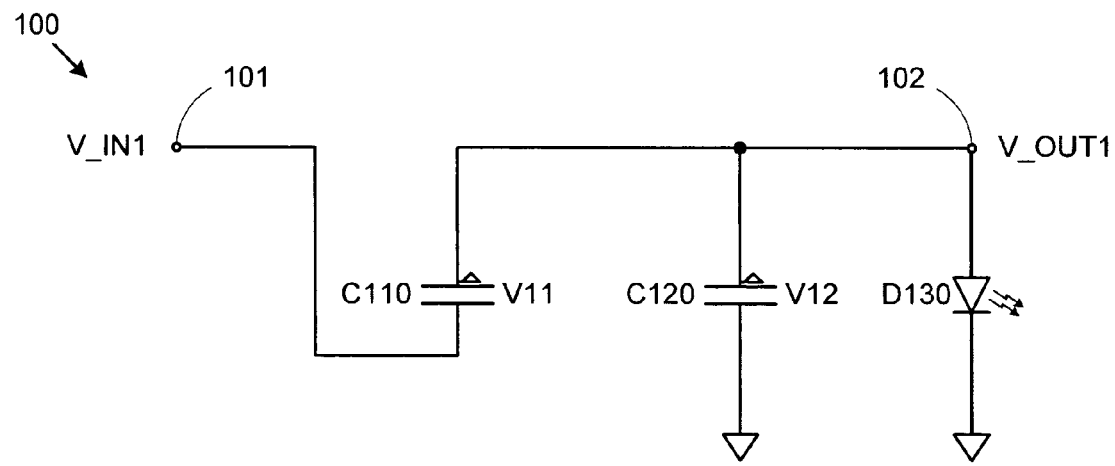
Figure 2A:
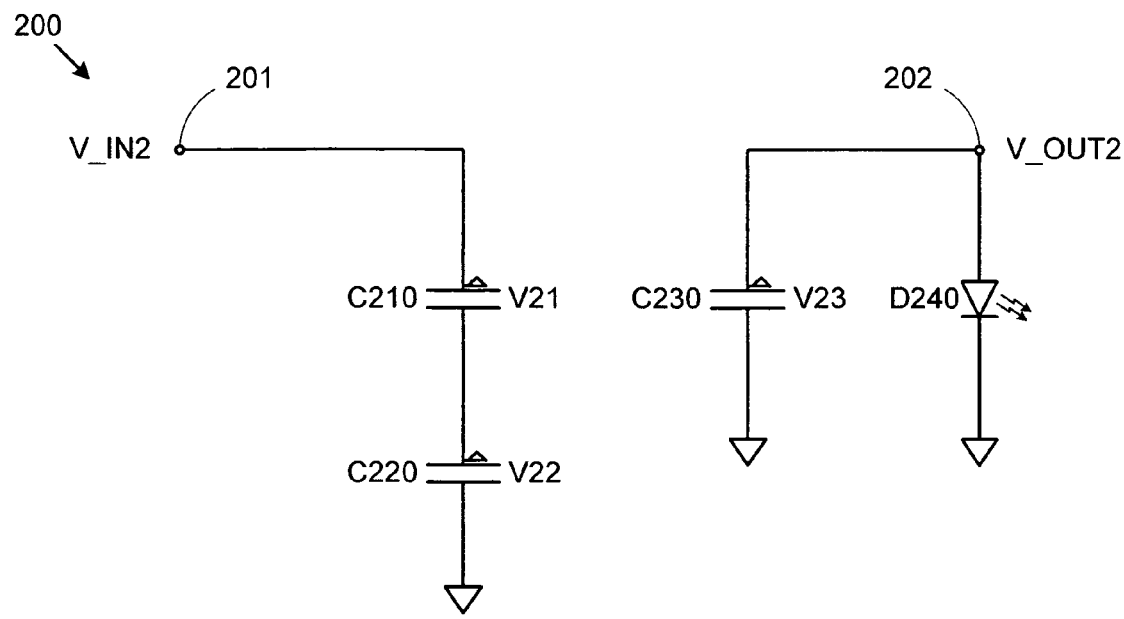
FIGS. 2A and 2B are schematic diagrams of the operation of a conventional 3/2× charge pump.
Figure 2B:
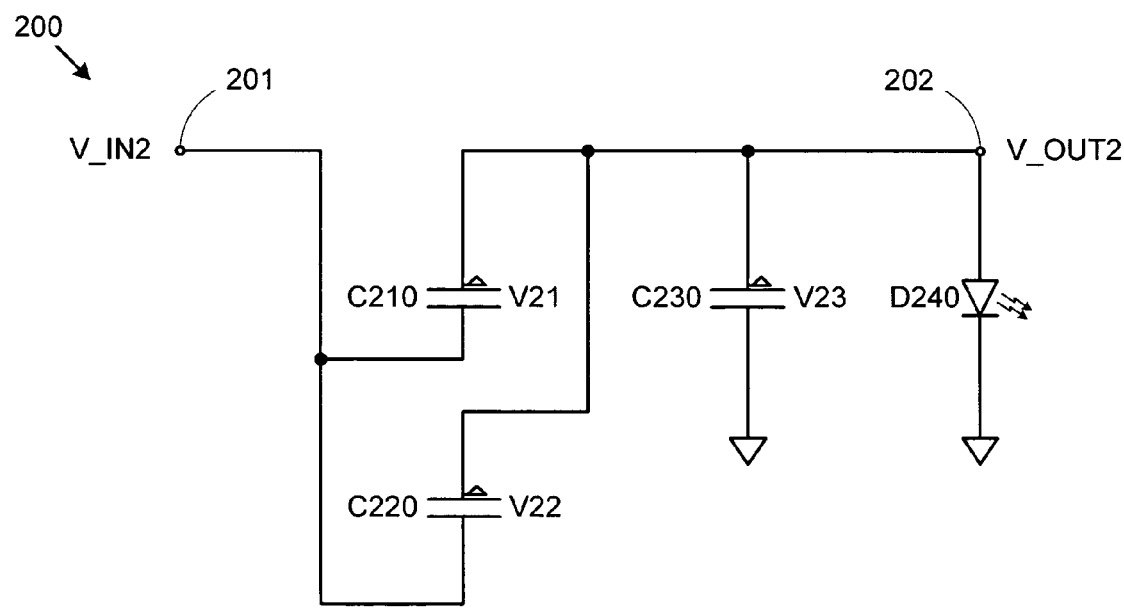

Note that unlike conventional charge pumps (e.g., 2× charge pump 100 in FIGS. 1A-1B and 3/2× charge pump in FIGS. 2A-2B), 4/3× charge pump 400 includes three distinct operational phases (as described with respect to FIGS. 4A-4C). Those three phases cause capacitors C410 and C420 to exhibit different nominal voltage potentials (i.e., voltages V41 and V42 will not be equal), and that difference in voltage levels determines the nominal value for output voltage V_OUT4.

To calculate the nominal values for voltages V41 and V42, Kirchoff's Second Law (conservation of voltage) can be used to generate voltage equations for the three phases of operation. Those equations can then be solved for voltages V41 and V42 to determine the relationship between those two voltages. For the charging phase (FIG. 4A), Kirchoff's Second Law states that:

$$V\_IN4 = V41 + V42 \qquad [\text{Eqn. 1}]$$

For the first discharging phase (FIG. 4B), Kirchoff's Second Law states that:

$$V\_OUT4 = V\_IN4 + V41 \qquad [\text{Eqn. 2}]$$

As described above with respect to FIG. 4B, the orientation of capacitor C410 with respect to input terminal 401 during the first discharging phase is inverted from the charging phase to the first discharging phase. Therefore, the voltage potential stored across capacitor 410 during the charging phase is added to input voltage V_IN4 during the first discharging phase.

Finally, for the second discharging phase (FIG. 4C), Kirchoff's Second Law states that:

$$V\_OUT4 = V\_IN4 - V41 + V42 \qquad [\text{Eqn. 3}]$$

As described above with respect to FIG. 4C, capacitor C410 is returned to its original (i.e., charging phase) orientation with respect to input terminal 401 during the second charging phase. Therefore, the voltage potential (V41) across capacitor C410 is subtracted from input voltage V_IN4. However, during the second discharging phase, the orientation of capacitor C420 with respect to input terminal 401 is reversed (as compared to the charging phase orientation of capacitor C410). Therefore, the voltage potential (V42) across capacitor C420 is added to input voltage V_IN4 during the second discharging phase.

Substituting Equation 2 into Equation 3 yields:

$$V\_IN4 + V41 = V\_IN4 - V41 + V42 \qquad [\text{Eqn. 4}]$$

which reduces to the following:

$$V42 = 2*V41 \qquad [\text{Eqn. 5}]$$

Thus, the voltage potential across capacitor C420 (i.e., voltage V42) is twice the magnitude of the voltage potential across capacitor C410 (i.e., voltage V41). Substituting Equation 5 into Equation 1 then yields:

$$V41 = (1/3)*V\_IN4 \qquad [\text{Eqn. 6}]$$

Finally, substituting Equation 6 into Equation 2 yields the following for output voltage V_OUT4:

$$V\_OUT4 = (4/3)*V\_IN4 \qquad [\text{Eqn. 7}]$$

Note that the same result can be derived by substituting Equations 5 and 6 into Equation 3. In either case, charge pump 400 provides a voltage multiplication factor of 4/3.

Figure 4D:
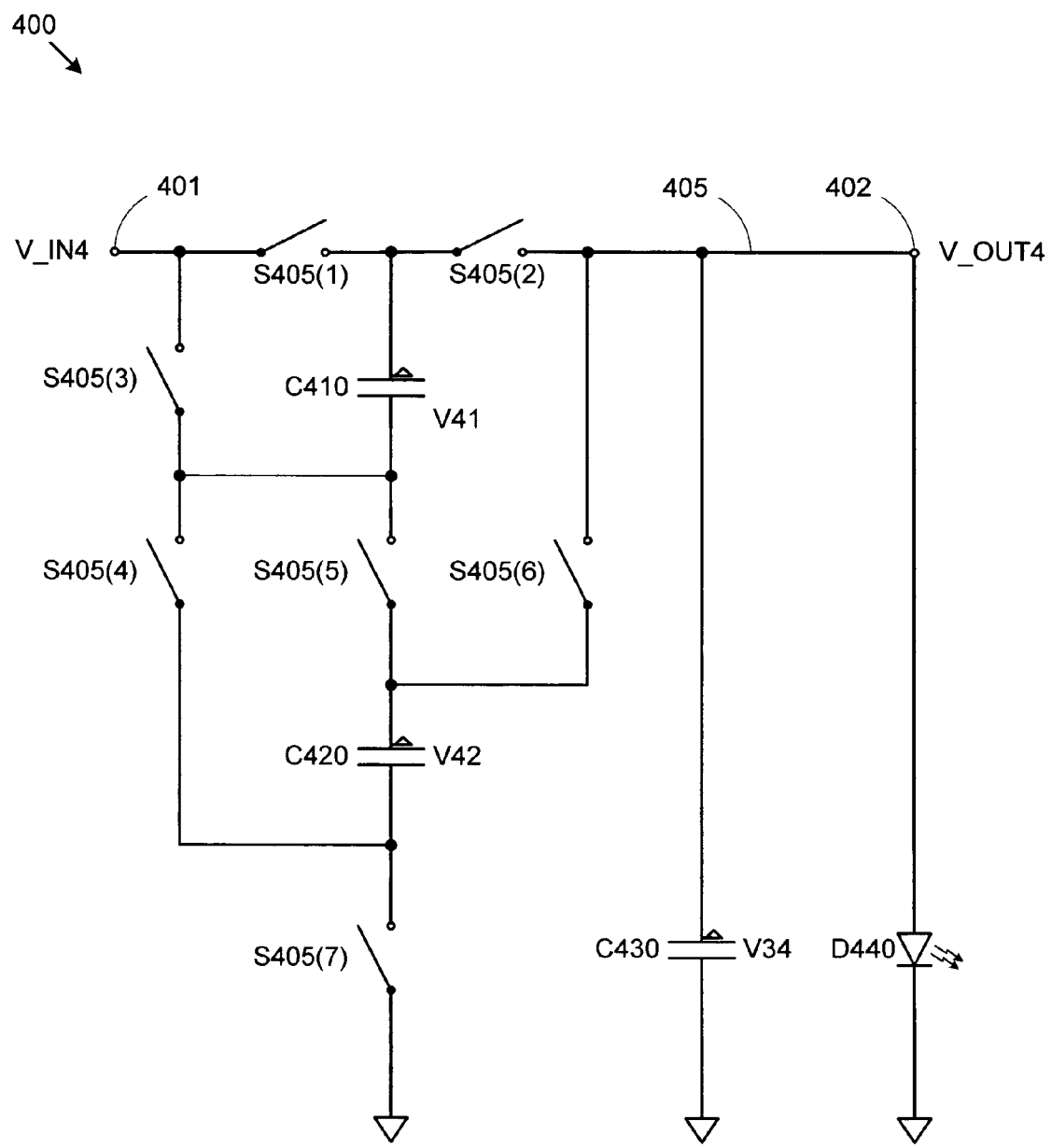
FIG. 4D is a schematic diagram of an exemplary switch configuration for the charge pump of FIGS. 4A-4C.

FIG. 4D shows 4/3× charge pump 400 including an embodiment of interconnect circuitry 405 that includes switches S405(1), S405(2), S405(3), S405(4), S405(5), S405(6), and S405(7). Switches S405(1) and S405(2) are connected between input terminal 401 and output terminal 402, with the positive plate of capacitor C410 being connected to the junction between switches S405(1) and S405(2). Switch S405(3) is connected between input terminal 401 and the negative plate of capacitor C410, while switch S405(4) is connected between the negative plate of capacitor C410 and the negative plate of capacitor C420. Switch S405(5) is connected between the negative plate of capacitor C410 and the positive plate of capacitor C420, and switch S405(6) is connected between the positive plate of capacitor C420 and output terminal 402. Finally, switch S405(7) is connected between the negative plate of capacitor C420 and ground.

Thus, during the charging phase, switches S405(1), S405(5), and S405(7) are closed, while the remainder of switches S405 are open, thereby allowing charging of capacitors C410 and C420 as shown in FIG. 4A. Then, during the first discharging phase, switches S405(3) and S405(2) are closed, and the remainder of switches S405 are opened, thereby inverting and connecting capacitor C420 between input terminal 401 and output terminal 402, as shown in FIG. 4B. Note that switch S405(7) can be either open or closed during the first discharging phase, as grounding the negative plate of capacitor C420 during this phase will have no effect on the charge stored on capacitor C420. Finally, during the second discharging phase, only switches S405(1), S405(4), and S405(6) are closed, thereby connecting capacitors C410 (non-inverted) and C420 (inverted) between input terminal 401 and output terminal 402, as shown in FIG. 4C.

Note that the particular switching configuration depicted in FIG. 4D can allow charge pump 400 to operate as a 3/2× charge pump, simply by changing the opening/closing pattern of switches S405. For example, to provide a 3/2× voltage multiplication factor, switches S405(1), S405(5), and S405(7) could be closed during a charging phase, and switches S405(2), S405(3), S405(4), and S405(6) could be closed during a discharging phase (thereby providing a capacitor configuration similar to that described with respect to FIG. 2B).

Note further that various other switching configurations can be used to provide additional voltage multiplication factors. For example, an additional switch could be provided between the negative plate of capacitor C410 and the junction between switches S405(3) and S405(4), thereby allowing capacitors C420 and C410 to be inverted and connected in series between input terminal 401 and output terminal 402 (e.g., by opening the new switch and closing switches S405(2), S405(3), S405(4), and S405(5)) to provide a 2× voltage multiplication factors. Various other switching configurations will be readily apparent.

Note that due to switch resistance within charge pump 400, output voltage V_OUT may not precisely reach 4/3 of input voltage V_IN. For example, if the combined switch resistance (open loop) across charge pump 400 is 1 ohm during each operational phase, a 100 mA load (D440) and an input voltage V_IN equal to 3 V will result in an output voltage V_OUT equal to 3.9 V (i.e., 3.9 V=(4/3*3 V)−(1 Ω*1 mA)), rather than the ideal output voltage value of 4.0 V (i.e., 4.0 V=4/3*3 V). Therefore, reducing the switch resistance within charge pump 400 can allow output voltage V_OUT to more closely approach the ideal 4/3 multiple of input voltage V_IN. Note that this does not change the fact that charge pump 400 is a 4/3 charge pump, since the rating of a charge pump is based on operation under ideal conditions (i.e., no losses due to switch resistance, no load, and steady state operation). In general, any circuit incorporating charge pump 400 will operate properly so long as output voltage V_OUT provided by charge pump 400 is substantially equal to 4/3 times input voltage V_IN (e.g., voltage V_OUT is within 5% of 4/3 times voltage V_IN).

Note further that under ideal conditions, all of capacitors C410, C420, and C430 will exhibit perfectly stable voltages V41, V42, and V43, respectively. However, in actual operating (i.e., non-ideal) conditions, the time constants associated with the capacitors will determine the values of capacitor voltages V41, V42, and V43 at any given time. In one embodiment, by setting the durations of the various operational phases (i.e., the duration of the first charging phase, the second charging phase, and the discharging phase) to be much much less then the time constants of the capacitors under load during those particular phases, the input current ripple and output voltage ripple for charge pump 400 can be minimized. For example, by constructing charge pump 400 such that the period of each operational phase is less than five times the time constant of the capacitors (and associated switching circuitry) under load during those phases, the output voltage V_OUT generated by charge pump 400 will be substantially equal to 4/3 of input voltage V_IN (e.g., output voltage V_OUT4 will be within 5% of input voltage V_IN4).

Figure 3A:
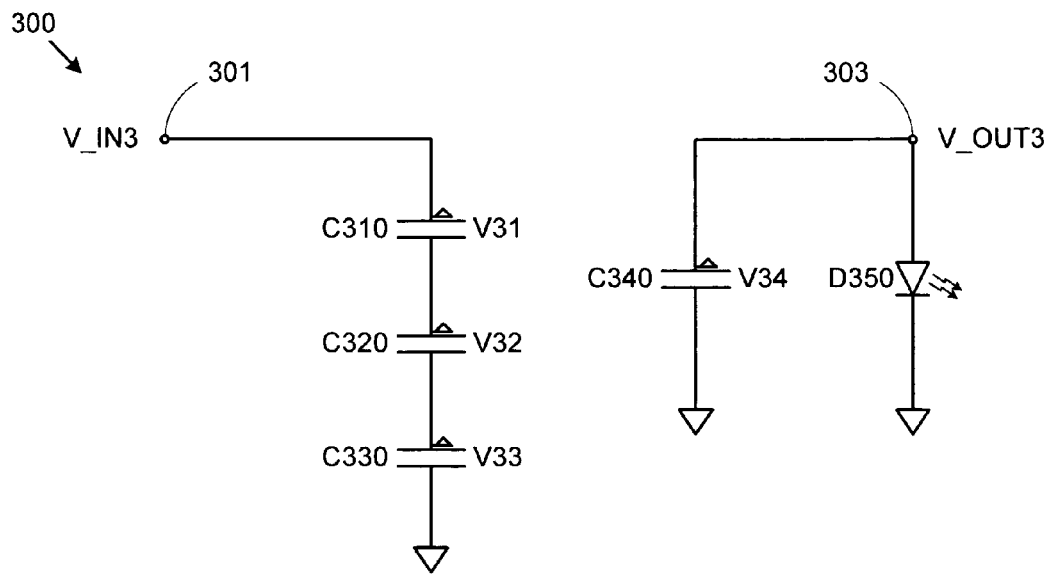
FIGS. 3A and 3B are schematic diagrams of the operation of a conventional 4/3× charge pump.
Figure 3B:
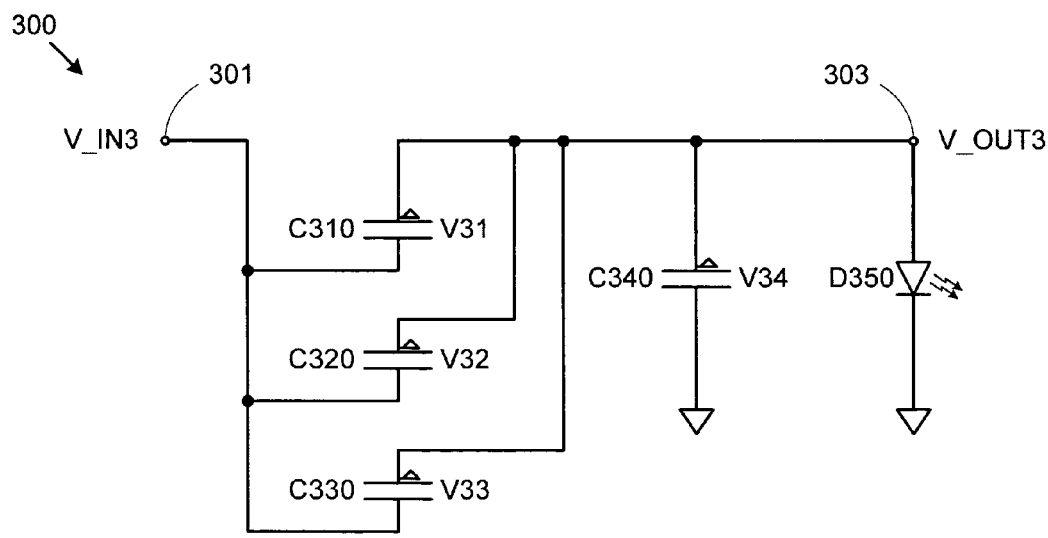
Figure 5:
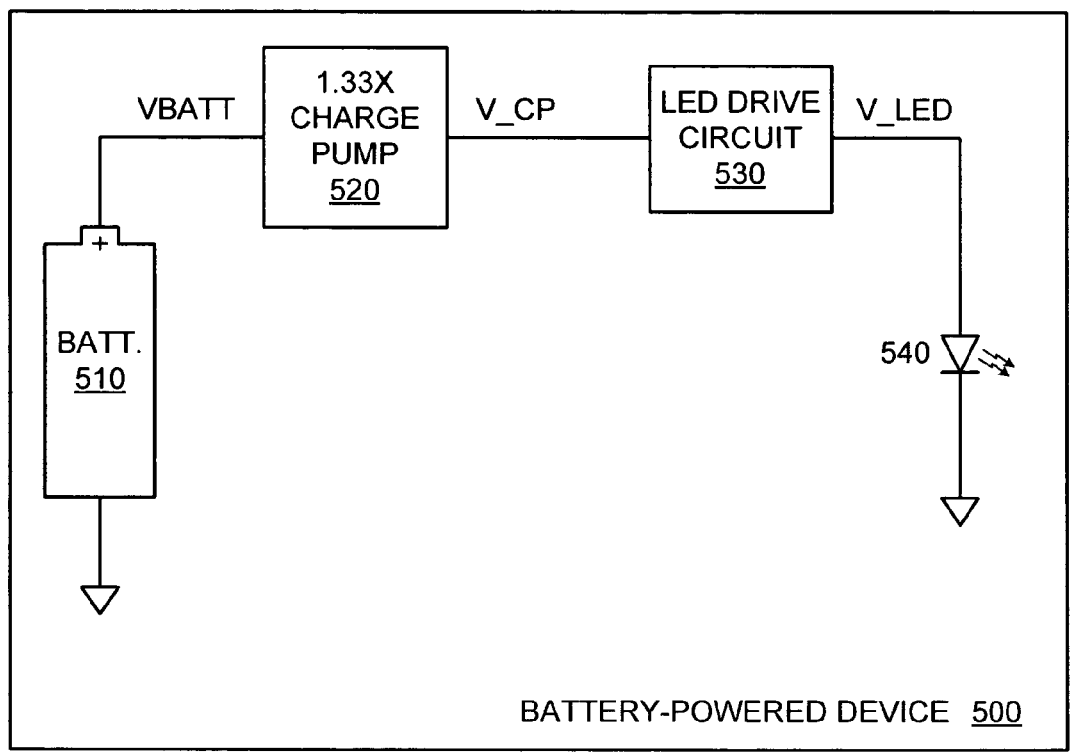
FIG. 5 is a block diagram of an electronic device that incorporates the charge pump of FIGS. 4A-4C.

By providing a 4/3× voltage multiplication factor, charge pump 400 can beneficially provide enhanced power efficiency in white LED driver circuits over conventional 3/2× charge pumps (i.e., charge pump 200 shown in FIGS. 2A and 2B), while reducing capacitor count (and hence, overall circuit size) over conventional 4/3× charge pumps (i.e., charge pump 300 shown in FIGS. 3A and 3B). For example, FIG. 5 shows a block diagram of a battery-powered device 500 that includes a battery 510, a 4/3× charge pump 520, an LED drive circuit 530, and a white LED 540. Device 500 could, for example, be a cell phone, a personal digital assistant, a portable multimedia device, a digital camera, a video camera, or any other device for which white LED lighting would be useful. Battery 510 can be any type of battery, such as a lithium ion or lithium polymer rechargeable battery providing a nominal voltage VBATT of 3.7 V, with an actual output voltage range between 3.0 V and 4.2 V (other types (and any number) of batteries, such as nickel metal hydride (NiMH) rechargeable or alkaline or lithium primary (non-rechargeable) batteries, among others, could also be used). Note that the particular arrangement (order) of elements within device 500 is purely exemplary, and various other arrangements will be readily apparent. For example, in another embodiment, LED drive circuit 530 could be connected between LED 540 and ground.

Charge pump 520 is substantially similar to charge pump 400 described with respect to FIGS. 4A-4C, and converts battery voltage VBATT (corresponding to input voltage V_IN4 in FIGS. 4A-4C) to an elevated charge pump voltage V_CP that is 4/3× greater than battery voltage VBATT. LED drive circuit 530 then provides any necessary voltage attenuation on charge pump voltage V_CP to generate an appropriate LED drive voltage V_LED that is supplied to white LED 540. Because the battery voltage VBATT can actually range from 3.0 V to 4.2 V, charge pump voltage V_CP can range from 4.0 V to 5.6 V. Therefore, if the required LED drive voltage V_LED is equal to 3.6 V, LED drive circuit 530 will be required to attenuate charge pump voltage V_CP by a maximum of 2.0 V.

In contrast, a conventional 3/2× charge pump (e.g., charge pump 200 described with respect to FIGS. 2A and 2B) would generate a maximum output voltage of 6.3 V (i.e., 1.5 times 4.2 V), thereby requiring LED drive circuit 530 to provide a maximum voltage attenuation of 2.7 V (i.e., 6.3 V minus 3.6 V). Therefore, 4/3× charge pump 520 can provide a roughly 25% reduction in wasted power (i.e., the power dissipation that occurs during voltage attenuation) over a 3/2× charge pump, thereby allowing battery-powered device 500 to operate for a significantly longer time than would be possible with a 3/2× charge pump.

Note that during actual operation of charge pump 400 described with respect to FIGS. 4A-4C, the actual values for voltages V41, V42, and V43 on capacitors C410, C420, and C430, respectively, will always be changing slightly over time. For example, during the charging phase (FIG. 4A), both voltages V41 and V42 will be increasing, as input voltage V_IN4 charges capacitors C410 and C420, respectively. Meanwhile, voltage V43 will be decreasing, as capacitor C430 drives load D440. Then, during the first discharging phase (FIG. 4B), voltage V41 will be decreasing as voltage V43 increases, as capacitor C410 is inverted to assist in the driving of load D440 and the charging of capacitor C430. Finally, during the second discharging phase (FIG. 4C), capacitor C410 is returned to its charging orientation while capacitor C420 is inverted, so that voltage V41 increases while voltage V42 decreases (voltage V43 continues to increase as capacitor C430 is further charged). However, as noted above, by limiting the duration of each phase, the actual voltage changes across capacitors C410, C420, and C430 during any given phase will be relatively small and will therefore not significantly affect the output of 4/3× charge pump 400. For example, using capacitance values of 1 μF for each of capacitors C410, C420, and C430, a total phase duration of 1000 ns (i.e., 1 MHz) for a load up to 200 mA will provide an output ripple of 60 mV or less for a nominal 3 V input voltage V_IN, which is well within the desired ±5% output deviation. In general, these output voltage effects will be much smaller than the effects of internal switching resistance (as described above).

Figure 6:
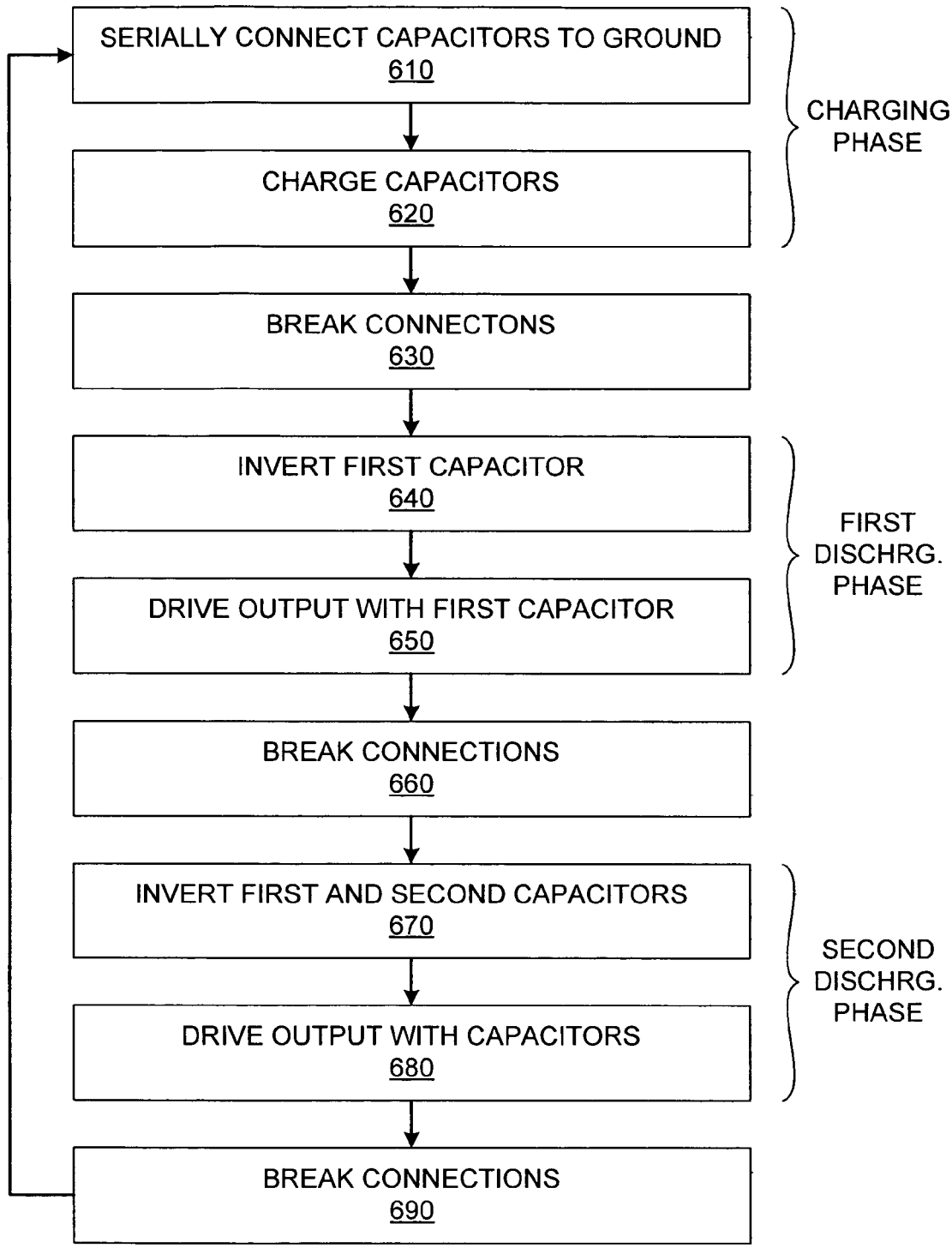
FIG. 6 is a flow diagram of the operation of the charge pump of FIGS. 4A-4C.

Note further that to prevent the formation of undesirable electrical paths as the interconnect circuitry in charge pump 520 is reconfigured between phases, each of capacitors C410, C420, and C430 can be disconnected from the circuitry in charge pump 520 (i.e., electrically isolated) during each phase transition. For example, FIG. 6 shows a flow diagram for an exemplary method of operating charge pump 400 (as described with respect to FIGS. 4A-4C). In a "SERIALLY CONNECT CAPACITORS TO GROUND" step 610, capacitors C410 and C420 are connected between input terminal 401 and ground as shown in FIG. 4A, and are then charged in a "CHARGE CAPACITORS" step 620. Steps 610 and 620 therefore define the charging phase of transistor 400. To transition to the next phase (i.e., the first discharging phase), capacitors C410, C420, and C430 are disconnected from the remainder of the charge pump circuitry to prevent undesirable electrical path formation in a "BREAK CONNECTIONS" step 630.

Next, as described with respect to FIG. 4B, capacitor C410 is inverted relative to input terminal 401 and is connected between input terminal 401 and output terminal 402 in an "INVERT FIRST CAPACITOR" step 640. The input voltage at input terminal 401 and the additional voltage potential across capacitor C410 are then combined to provide the elevated output voltage at output terminal 402 in a "DRIVE OUTPUT WITH FIRST CAPACITOR" step 650. Upon completion of this first discharging phase, capacitors C410, C420, and C430 are again disconnected from the remainder of the charge pump circuitry in a "BREAK CONNECTIONS" step 660.

Then, to begin the second discharging phase of operation, both capacitor C410 and C420 are inverted with respect to input terminal 401 (which places capacitor C410 back in its original orientation from the charging phase) and connected between input terminal 401 and output terminal 402 as described with respect to FIG. 4C in an "INVERT FIRST AND SECOND CAPACITORS" step 670. The input voltage at input terminal and the net voltage potential across capacitors C410 and C420 are then used to provide the output voltage at output terminal 402 in a "DRIVE OUTPUT WITH CAPACITORS" step 680. Finally, upon completion of the second discharging phase, capacitors C410, C420, and C430 are again disconnected from the remainder of the charge pump circuitry in a "BREAK CONNECTIONS" step 690, and the process loops back to step 610.

Because capacitors C410, C420, and C430 are constantly charging or discharging during each of the operational phases of charge pump 400, input terminal 401 will see a slight voltage mismatch at the start of every new phase (i.e., after each of steps 630, 660, and 690). For example, if a long time is spent in the charging phase at step 620, capacitor C430 in FIG. 4A may discharge down to 3.5 V (from a nominal voltage of 4.0 V based on a battery input voltage V_IN4 of 3.0 V). Then, when charge pump 400 is reconfigured for the first discharging phase in step 640 (FIG. 4B), the sum of input voltage V_IN4 (3.0 V) and the voltage across capacitor C410 (1.0 V) will exhibit a relatively large mismatch with the voltage on capacitor C430 (i.e., 4.0 V versus 3.5 V). This voltage mismatch can send undesirable line noise (i.e., current transients) out through input terminal 401, which in turn can result in interference to other circuitry connected to input terminal 401 (e.g., battery 510 in FIG. 5). Therefore, to minimize this line noise, an appropriate phase timing scheme can be developed.

In general, line noise will be minimized when the voltage mismatch between the charge pump output voltage V_OUT4 and the voltage V43 on storage capacitor C430 is substantially the same during each phase transition. A phase timing to achieve such a result can be derived as follows. First, consider that in an idealized (lossless) charge pump 400, the power input at input terminal 401 will equal the power output at output terminal 402. This relationship can be represented by the following:

$$P_{IN}=P_{OUT} \quad \text{[Eqn. 8]}$$

where $P_{IN}$ is the input power and $P_{OUT}$ is the output power. Because power is equal to voltage times current, Equation 8 can be rewritten as the following:

$$V\_IN4*I_{IN}=V\_OUT4*I_{OUT} \quad \text{[Eqn. 9]}$$

where $I_{IN}$ is the input current supplied to input terminal 401 and $I_{OUT}$ is the output (load) current provided at output terminal 402. Substituting Equation 7 into Equation 9 yields:

$$I_{OUT}=(3/4)*I_{IN} \quad \text{[Eqn. 10]}$$

Therefore, the output current provided by charge pump 400 at output terminal 402 is equal to three-fourths of the input current received at input terminal 401.

The total charge provided at input terminal 401 during a single operational cycle (i.e., a single sequence of the three operational phases) can be represented by the following:

$$Q_{IN}=\Delta t_1 I_{IN1}+\Delta t_2 I_{IN2}+\Delta t_3 I_{IN3} \quad \text{[Eqn. 12]}$$

where $Q_{IN}$ is equal to the total input charge for the three phases of operation for charge pump 400, and where $\Delta t_1$, $\Delta t_2$, and $\Delta t_3$ are the periods for the charging phase (FIG. 4A), the first discharging phase (FIG. 4B) and the second discharging phase (FIG. 4C), respectively, for charge pump 400, while $I_{IN1}$, $I_{IN2}$, and $I_{IN3}$ are the input currents supplied during the charging phase, the first discharging phase, and the second discharging phase, respectively. NTo achieve low input noise, the average input current during each phase should be the same (i.e., $I_{IN1}=I_{IN2}=I_{IN3}=I_{IN}$), so that Equation 12 can be reduced to the following:

$$Q_{IN}=I_{IN}*(\Delta t_1+\Delta t_2+\Delta t_3) \quad \text{[Eqn. 13]}$$

Similarly, the total charge output at output terminal 402 during a single operational cycle can be given by the following:

$$Q_{OUT}=I_{OUT}*(\Delta t_1+\Delta t_2+\Delta t_3) \quad \text{[Eqn. 14]}$$

where $Q_{OUT}$ is equal to the total output charge for the three phases of operation for charge pump 400. However, because output terminal 402 is disconnected from capacitors C410 and C420 during the charging phase (as described above with respect to FIG. 4A), conservation of charge mandates that the charge provided to storage capacitor C430 during the first discharging phase and the second discharging phase be equal to the total output charge $Q_{OUT}$, as indicated by the following:

$$Q_{OUT}=I_{IN}*(\Delta t_2+\Delta t_3) \quad \text{[Eqn. 15]}$$

Combining Equations 14 and 15 yields the following:

$$I_{OUT}*(\Delta t_1+\Delta t_2+\Delta t_3)=I_{IN}*(\Delta t_2+\Delta t_3) \quad \text{[Eqn. 16]}$$

and substituting Equation 10 into Equation 16 resolves to the following:

$$(3/4)*(\Delta t_1+\Delta t_2+\Delta t_3)=\Delta t_2+\Delta t_3 \quad \text{[Eqn. 17]}$$

To solve for $\Delta t_1$, a normalizing equation can be defined for periods $\Delta t_1$, $\Delta t_2$, and $\Delta t_3$ as shown below:

$$\Delta t_1+\Delta t_2+\Delta t_3=1 \quad \text{[Eqn. 18]}$$

Substituting Equation 18 into Equation 17 yields the following:

$$\Delta t_1=1/4 \quad \text{[Eqn. 20]}$$

Thus, to implement charge pump 400 as a low-noise charge pump, the charging period (i.e., period $\Delta t_1$) should be one fourth of the duration of a complete cycle (i.e., $\Delta t_1+\Delta t_2+\Delta t_3$).

Next, to determine values for periods $\Delta t_2$ and $\Delta t_3$, it can be noted that for a low-noise charge pump, the voltage change at input terminal 401 is the same during each phase of operation. Therefore, the change in voltage across capacitors C410 and C420 during the charging phase should be the same as the change in voltage across capacitor C410 during the first discharging phase. This relationship can be expressed as follows:

$$\Delta V_1=\Delta V_2 \quad \text{[Eqn. 21]}$$

where $\Delta V_1$ is the voltage change across capacitors C410 and C420 during the charging phase, and $\Delta V_2$ is the voltage change across capacitor C410 during the first discharging phase. Therefore, $\Delta V_1$ can be expressed by the following:

$$\Delta V_1 = I_{IN} * \Delta t_1 / C_1 + I_{IN} * \Delta t_1 / C_2 \quad [\text{Eqn. 22}]$$

where C1 and C2 are the capacitances of capacitors C410 and C420, respectively. If capacitors C410 and C420 are selected to have equal capacitances (C), then Equation 22 reduces to the following:

$$\Delta V_1 = 2 I_{IN} * \Delta t_1 / C \quad [\text{Eqn. 23}]$$

Similarly, $\Delta V_2$ can be expressed by the following:

$$\Delta V_2 = I_{IN} * \Delta t_2 / C \quad [\text{Eqn. 24}]$$

Substituting Equations 23 and 24 into Equation 21 then yields:

$$2 I_{IN} * \Delta t_1 / C = I_{IN} * \Delta t_2 / C \quad [\text{Eqn. 25}]$$

which can be reduced to the following:

$$2 \Delta t_1 = \Delta t_2 \quad [\text{Eqn. 26}]$$

Equation 20 can then be substituted into Equation 26 to yield the following for period $\Delta t_2$:

$$\Delta t_2 = \frac{1}{2} \quad [\text{Eqn. 27}]$$

Finally, based on Equations 19, 20, and 27, period $\Delta t_2$ can be given by the following:

$$\Delta t_3 = \frac{1}{4} \quad [\text{Eqn. 28}]$$

Thus, to implement charge pump 400 as a low input noise charge pump, the charging phase and the second discharging phase should both be half as long as the first discharging phase.

Note that the above analysis for the relative time periods of the various phases for assumes a substantially equal total wiring and switch resistance between all the capacitors (and input/output terminals) in charge pump 400. As will be obvious to one skilled in the art, the relative lengths of the periods for the different phases of operation may need to be adjusted from the values derived above (i.e., $\Delta t_1 = \frac{1}{4}$, $\Delta t_2 = \frac{1}{2}$, $\Delta t_3 = \frac{1}{4}$) if the wire/switch resistances exhibit significant differences.

Although the present invention has been described in connection with several embodiments, it is understood that this invention is not limited to the embodiments disclosed, but is capable of various modifications that would be apparent to one of ordinary skill in the art. For example, charge pump 400 could include control logic to allow configuration and operation of capacitors C410 and C420 in a 3/2× charge pump mode (as described with respect to FIGS. 2A and 2B), thereby allowing charge pump 400 to provide different levels of voltage multiplication. Furthermore, although the operation of charge pump 400 is described with respect to two charging capacitors (i.e., C410 and C420), in various other embodiments, any number of charging capacitors can be incorporated (e.g., three charging capacitors that are charged in series, and then used to drive the output voltage in various arrangements of charging and discharging orientations. Thus, the invention is limited only by the following claims.

The invention claimed is:

1. A charge pump comprising:
   a first input terminal configured to receive a first supply voltage;
   a second input terminal configured to receive a second supply voltage;
   an output terminal configured to provide an output voltage;
   a first capacitor;
   a second capacitor; and
   interconnection circuitry configured to couple the first capacitor and the second capacitor in a first configuration, a second configuration, and a third configuration during a first operational phase, a second operational phase, and a third operational phase, respectively, wherein the first and second capacitors are connected in series between the first and second input terminals in the first configuration, wherein the first capacitor is connected between the first input terminal and the output terminal, and the second capacitor is isolated from the output terminal in the second configuration, and wherein the first and second capacitors are connected in series between the first input terminal and the output terminal in the third configuration.

2. The charge pump of claim 1, wherein a first orientation of the first capacitor in the second operational phase is inverted relative to a second orientation of the first capacitor in the first operational phase and the third operational phase, and
   wherein a third orientation of the second capacitor in the third operational phase is inverted relative to a fourth orientation of the second capacitor in the first operational phase.

3. The charge pump of claim 1, further comprising control logic for cycling the charge pump through the first operational phase, the second operational phase, and the third operational phase in repeating sequence.

4. The charge pump of claim 1, wherein the first capacitor, the second capacitor, and the third capacitor all have a first capacitance value,
   wherein the first operational phase and the third operational phase each have a first duration,
   wherein the second operational phase has a second duration, and
   wherein the second duration is twice as long as the first duration.

5. The charge pump of claim 1, further comprising a third capacitor connected between the output terminal and the second input terminal.

6. The charge pump of claim 1, wherein an average output voltage generated at the output terminal is substantially equal to 1.33 times the first supply voltage.

7. A method for operating a charge pump, the method comprising:
   charging a first capacitor and a second capacitor in series between a first supply voltage and a second supply voltage during a first operational phase;
   discharging the first capacitor, but not the second capacitor, between the first supply voltage and an output terminal of the charge pump during a second operational phase; and
   charging the first capacitor and discharging the second capacitor in series between the first supply voltage and the output terminal during a third operational phase.

8. The method of claim 7, wherein a first average voltage at the output terminal during the second operational phase and a second average voltage at the output terminal during the third operational phase are substantially equal to 1.33 times the first supply voltage.

9. The method of claim 8, further comprising providing a third capacitor between the output terminal and the second supply voltage,
wherein the first capacitor, the second capacitor, and the third capacitor all have substantially the same capacitance,
wherein the step of discharging the first capacitor is performed for a first duration, and
wherein the step of charging the first capacitor and the second capacitor in series and the step of charging the first capacitor and discharging the second capacitor in series are both performed for a second duration, the second duration being half of the first duration.

10. The method of claim 7, further comprising electrically isolating the first capacitor, the second capacitor, and the third capacitor before each of the steps of charging the first capacitor and the second capacitor in series, discharging the first capacitor, and charging the first capacitor and discharging the second capacitor in series.

11. A charge pump comprising:
first means for charging a first capacitor and a second capacitor in series between a first voltage supply terminal and a second voltage supply terminal during a first operational phase;
second means for discharging the first capacitor, but not the second capacitor, between the first voltage supply terminal and an output terminal of the charge pump during a second operational phase; and
third means for charging the first capacitor and discharging the second capacitor in series between the first voltage supply terminal and the output terminal during a third operational phase.

12. The charge pump of claim 11, further comprising means for operating the first means, the second means, and the third means in repeating sequence.

13. The charge pump of claim 12, further comprising means for electrically isolating the first capacitor, the second capacitor, and the third capacitor before operating each of the first means, the second means, and the third means.

14. The charge pump of claim 11, further comprising:
a third capacitor connected between the output terminal and the second voltage supply terminal, wherein the first capacitor, the second capacitor, and the third capacitor all have substantially the same capacitance; and
means for operating the first means, the second means, and the third means for a first duration, a second duration, and a third duration, respectively, wherein the first duration and the third duration are each half as long as the second duration.

15. The charge pump of claim 1, wherein the first capacitor has a first orientation with respect to the first input terminal in the first and third operational phases, and a second orientation, opposite the first orientation, with respect to the first input terminal in the second operational phase.

16. The charge pump of claim 15, wherein the second capacitor has a first orientation with respect to the first input terminal in the first operational phase, and a second orientation, opposite the first orientation, with respect to the first input terminal in the third operational phase.

17. The charge pump of claim 16, wherein in the second configuration, the second capacitor is not coupled to the first input terminal or the output terminal.

18. The method of claim 17, further comprising coupling the first capacitor in a first orientation with respect to the first input terminal in the first and third operational phases, and coupling the first capacitor in a second orientation, opposite the first orientation, with respect to the first input terminal in the second operational phase.

19. The method of claim 18, further comprising coupling the second capacitor in a first orientation with respect to the first input terminal in the first operational phase, and coupling the second capacitor in a second orientation, opposite the first orientation, with respect to the first input terminal in the third operational phase.

20. The method of claim 7, further comprising isolating the second capacitor from the first input terminal and the output terminal during the second operational phase.

21. The method of claim 7, wherein the average output voltage provided at the output terminal is substantially equal to 1.33 times the first supply voltage.

22. The method of claim 7, further comprising coupling an output capacitor to the output terminal during the first, second and third operational phases.

23. The method of claim 7, further comprising cycling through the first operational phase, the second operational phase, and the third operational phase in a repeating sequence.

* * * * *